US010402608B2

(12) United States Patent
Schmidt et al.

(10) Patent No.: US 10,402,608 B2
(45) Date of Patent: Sep. 3, 2019

(54) RADIO FREQUENCY IDENTIFICATION CARD MONITOR

(71) Applicant: ENT. SERVICES DEVELOPMENT CORPORATION LP, Houston, TX (US)

(72) Inventors: Lawrence Schmidt, Rutledge, GA (US); Satwant Kaur, Mountain View, CA (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 5 days.

(21) Appl. No.: 15/306,728

(22) PCT Filed: Sep. 12, 2014

(86) PCT No.: PCT/US2014/055337
§ 371 (c)(1),
(2) Date: Oct. 25, 2016

(87) PCT Pub. No.: WO2016/039766
PCT Pub. Date: Mar. 17, 2016

(65) Prior Publication Data
US 2017/0220830 A1    Aug. 3, 2017

(51) Int. Cl.
*G06K 19/00* (2006.01)
*G06K 7/10* (2006.01)
*G06Q 10/08* (2012.01)

(52) U.S. Cl.
CPC ..... *G06K 7/10386* (2013.01); *G06K 7/10128* (2013.01); *G06K 7/10297* (2013.01); *G06Q 10/087* (2013.01)

(58) Field of Classification Search
USPC ................................................. 235/487, 492
See application file for complete search history.

(56) References Cited

U.S. PATENT DOCUMENTS

| | | |
|---|---|---|
| 6,259,367 B1 | 7/2001 | Klein |
| 7,239,241 B2 | 7/2007 | Claudatos et al. |
| 8,707,460 B2 | 4/2014 | Cabouli |
| 2005/0242176 A1 | 11/2005 | Roberge et al. |

(Continued)

FOREIGN PATENT DOCUMENTS

| | | |
|---|---|---|
| WO | WO-2007016298 | 2/2007 |
| WO | WO-2014096514 | 6/2014 |

OTHER PUBLICATIONS

PCT; "Notification of Transmittal of the International Search Report and the Written Opinion of the International Searching Authority, or the Declaration"; cited in PCT/US2014/055337; dated May 28, 2015; 12 pages.

*Primary Examiner* — Matthew Mikels
(74) *Attorney, Agent, or Firm* — Sheppard Mullin Richter & Hampton LLP (57) ABSTRACT

An example radio frequency identification card monitor is disclosed herein. An example radio frequency identification card monitor includes an example detector to identify radio frequency identification cards, a card tracker to track the radio frequency identification card with a proximity of the apparatus, and an interface to provide alerts when the radio frequency identification cards are not within the proximity.

15 Claims, 10 Drawing Sheets

(56) References Cited

U.S. PATENT DOCUMENTS

| | | | |
|---|---|---|---|
| 2006/0244601 A1* | 11/2006 | Nishimura | G07C 9/00111 340/572.4 |
| 2009/0040048 A1* | 2/2009 | Locker | G08B 21/24 340/572.1 |
| 2009/0079544 A1* | 3/2009 | Noble | H04Q 9/00 340/10.1 |
| 2010/0039233 A1* | 2/2010 | Niedzwiecki | H04Q 9/00 340/10.1 |
| 2010/0097237 A1 | 4/2010 | Christiansen | |
| 2010/0283600 A1 | 11/2010 | Herbert et al. | |
| 2012/0077584 A1 | 3/2012 | Sarmenta | |
| 2012/0092136 A1* | 4/2012 | Zhang | G06K 7/10049 340/10.2 |
| 2014/0145847 A1 | 5/2014 | Jenkins et al. | |

\* cited by examiner

| DETECTED RFID | INITIATION | COUNTER | TIME SINCE CONNECTION |
|---|---|---|---|
|  |  |  |  |
|  |  |  |  |
|  |  |  |  |
|  |  |  |  |
|  |  |  |  |
|  |  |  |  |
|  |  |  |  |

420 ⟶

| REGISTERED RFID | MOST RECENT DETECTION | MOST RECENT SCAN | TIMEOUT |
|---|---|---|---|
|  |  |  |  |
|  |  |  |  |
|  |  |  |  |
|  |  |  |  |
|  |  |  |  |
|  |  |  |  |
|  |  |  |  |

RADIO FREQUENCY IDENTIFICATION CARD MONITOR

CLAIM FOR PRIORITY

The present application is a national stage filing under 35 U.S.C. § 371 of PCT application number PCT/US2014/055337, having an international filing date of Sep. 12, 2014, the disclosure of which is hereby incorporated by reference in its entirety.

BACKGROUND

Radio frequency identification is a wireless use of radio-frequency electromagnetic fields for transferring data and/or information. Radio frequency identification utilizes radio frequency identification tags including circuitry (e.g., resistor(s), capacitor(s), inductor(s), etc.) for capturing, analyzing, and/or transmitting signals.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with at least one intermediate part located therebetween. Stating that any part is in contact with another part means that there is no intermediate part between the two parts.

DETAILED DESCRIPTION

Examples disclosed herein involve a radio frequency identification (RFID) card monitor for monitoring a presence of cards (or other objects) comprising RFID tags within a proximity. In examples disclosed herein, RFID cards may be automatically monitored (e.g., via near field communication) within a proximity of an RFID scanner. In examples disclosed herein, a user may be alerted when an RFID card is removed from a proximity (e.g., an area corresponding to a wallet, a pocket, a purse, a safe, a cabinet, etc.). In some examples, a user is only alerted after a designated period of time to allow for temporary removal of the example RFID cards from the proximity. In some examples, the user may be alerted at different times after an RFID card is removed from a proximity.

An example method includes detecting a radio frequency identification card within a proximity, the radio frequency identification card including a radio frequency identification tag, determining that the radio frequency identification card is not within the proximity, and sending an alert indicating that the radio frequency identification card is not within the proximity. An example apparatus disclosed herein includes an example detector to identify radio frequency identification cards, a card tracker to track the radio frequency identification card with a proximity of the apparatus, and an interface to provide alerts when the radio frequency identification cards are not within the proximity after a period of time.

Figure 1:
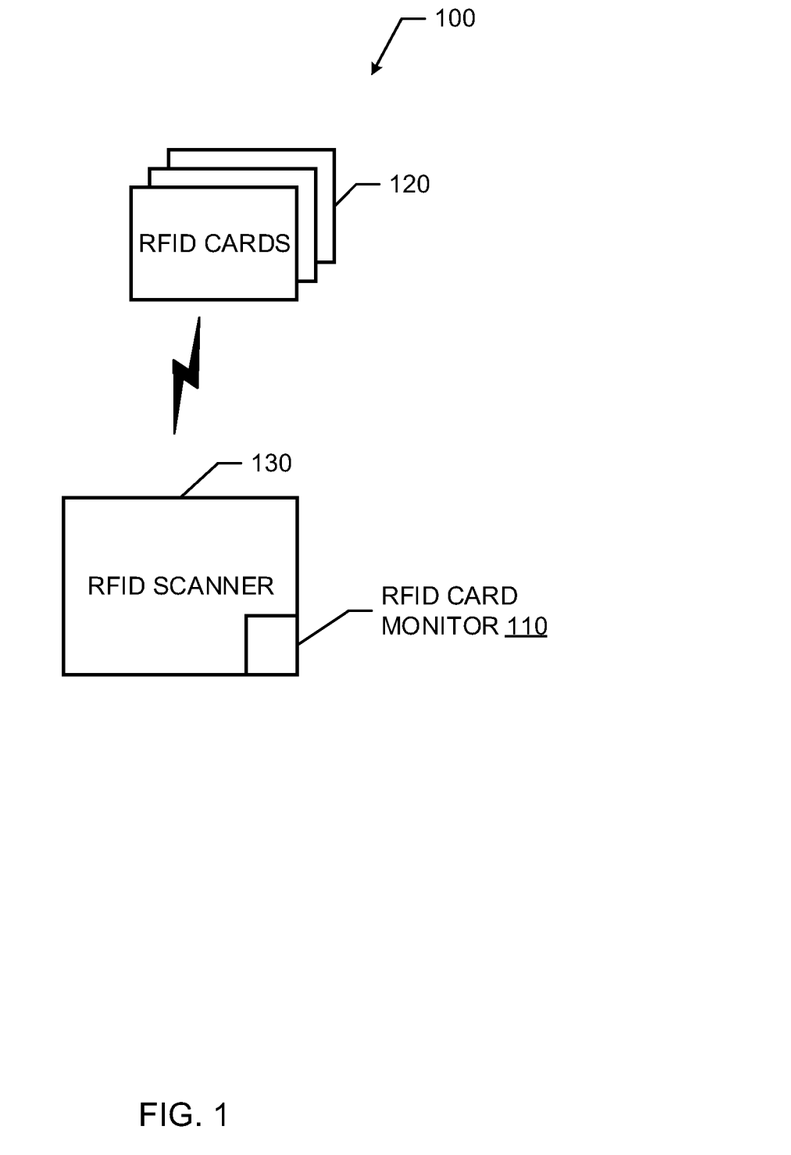
FIG. 1 is a schematic diagram of an example radio frequency identification (RFID) system including an example RFID card monitor constructed in accordance with an aspect of this disclosure.

FIG. 1 is a schematic diagram of an example radio frequency identification (RFID) system 100 including an example RFID card monitor 110 constructed in accordance with an aspect of this disclosure. The RFID system 100 of FIG. 1 includes example RFID cards 120 and an RFID scanner 130 including the RFID card monitor 110. The example RFID scanner 130 may detect the RFID cards 110 via wireless communication (e.g., via near field communication (NFC) and/or any other RFID communication technique).

The example RFID cards 120 of FIG. 1 may by any card or object that includes an RFID tag/identifier. Example RFID cards 120 may include, but are not limited to, at least one of a credit card, a debit card, an identification card, and a security card/badge. Accordingly, the RFID tag/identifier of the RFID cards 120 may identify a person (e.g., a user) and/or an account (e.g., a bank account, a credit account, etc.) associated with the person. The example RFID cards 120 are within a proximity (e.g., 1 foot, 1 yard, 1 meter, 2 meters, etc.) such that the RFID scanner 130 may wirelessly scan for and detect the RFID cards 110. For example, the RFID scanner 130 may send out signals that are received and returned and/or reflected by RFID tags of the RFID cards 120. In such an example, the RFID tags of the RFID cards 120 may be tags that identify a user and/or account associated with a user. For example, an RFID tag of one of the cards 120 may be used to authorize a transaction (e.g., a credit transaction, or debit transaction) and/or enable access to a building/secure location. As used herein a proximity is a space and/or area surrounding an object, such as the RFID card scanner and/or the RFID card monitor 110.

In some examples, an amount of the RFID cards 120 of FIG. 1 may vary. For example, one of RFID cards 120 may be removed from a proximity such that the RFID scanner 130 may no longer detect that particular RFID card. In another example a new RFID card is added to the RFID cards 120 such that the RFID scanner 130 is detecting more RFID cards 120 than were previously detected prior to the addition of the new RFID card. In some examples, the RFID cards 120 may be stored together in a card holder (e.g., a wallet, a purse, a pocket, etc.) along with the RFID scanner 130. In such an example, the RFID scanner 130 and/or RFID card monitor 110 may be configured to monitor the addition and/or removal of RFID cards 120 from the card holder (e.g., by adjusting proximity settings of the RFID scanner 130).

The example RFID scanner 130 may repeatedly and/or continuously scan for the presence of the RFID cards 120 and/or any other RFID card that has not been detected within a proximity surrounding the RFID scanner 130. Accordingly, the RFID scanner 130 may detect an RFID card in a first scan and may not detect the RFID card in a second scan after the RFID card is removed from a proximity surrounding the RFID scanner 130. In some examples, the RFID scanner 130 of FIG. 1 may be implemented by a mobile device, such as a smartphone, a tablet, a personal digital assistant (e.g., PDA) or any other device having NFC capabilities and/or RFID detection capabilities. Accordingly, in some examples, the RFID scanner 130 may include an interface (e.g., using input devices such as buttons, keyboards, trackpads, touchscreens, etc. and/or output devices such as a display, light emitting devices, speakers, etc.) to facilitate user interaction with and/or access to the RFID card monitor 110. The example RFID card monitor 110, as disclosed in examples herein, monitors for the removal and/or addition of new cards to the RFID cards 120. In some examples the RFID card monitor 110 may initiate alerts and/or notifications of removal of at least one of the RFID cards 120 and/or an addition of a new card to the RFID cards 120.

Figure 2:
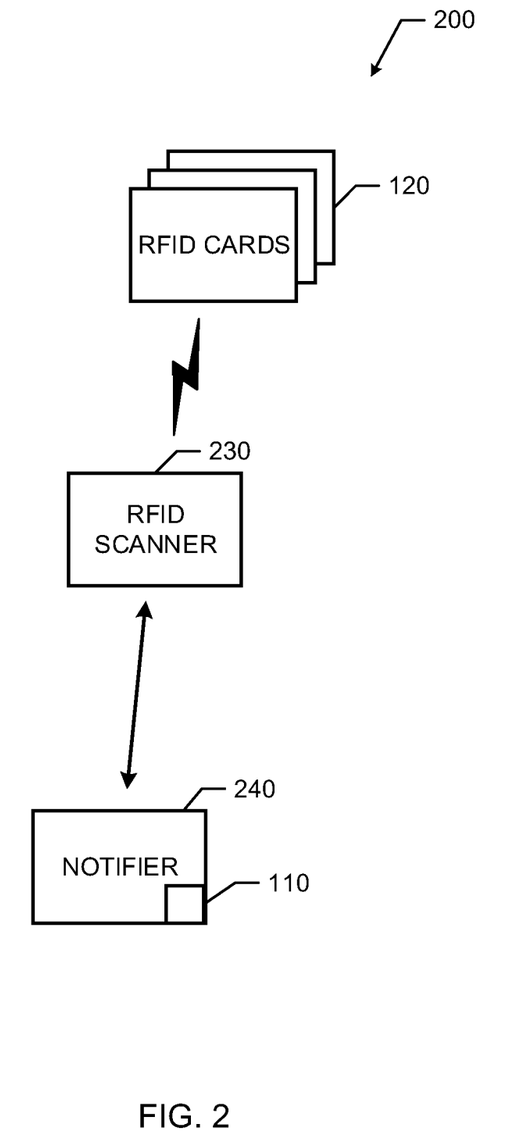
FIG. 2 is a schematic diagram of another example RFID including the example RFID card monitor system of FIG. 1.

FIG. 2 is a schematic diagram of another example RFID system 200 including the RFID card monitor 110. The RFID system 200 of FIG. 2 includes the RFID cards 120, an RFID scanner 230, and a notifier 240 including the RFID card monitor 110. The example RFID card monitor 110 of FIG. 2 may perform the same or similar functions as described above in connection with FIG. 1. However, in the example RFID system 200 of FIG. 2 the RFID card monitor 110 is located on a notifier 240 rather than an RFID scanner 230. Accordingly, the example RFID scanner 230 of FIG. 2 communicates with the notifier 240 to enable the RFID card monitor 110 of FIG. 2 to detect and/or monitor the RFID cards 110.

In the illustrated example of FIG. 2, the example RFID scanner 230 scans for and/or detects the RFID cards 120 and forwards RFID information (e.g., RFID tag/identifier, time associated with the detection, time of last scan, etc.) associated with the RFID cards 120 to the notifier 240 and/or the RFID card monitor 110. In the illustrated example of FIG. 2, the RFID scanner 230 may be included in a housing having a similar size and/or shape as the RFID cards 120. Accordingly, the RFID scanner 230 of FIG. 2 may be in a stack of cards (e.g., cards in a wallet) including the RFID cards 120 and forward information on the presence of the RFID cards to the notifier 240. For example, the RFID scanner 230 may include an active RFID tag and the RFID cards 120 may include a passive RFID tag. Accordingly, the RFID scanner 230 may detect the passive RFID tags of the RFID cards and forward identification information corresponding to the RFID tags to the notifier 240.

In examples disclosed herein, the RFID scanners 130, 230 of FIGS. 1 and 2 may directionally identify RFID tags/identifiers of the RFID cards 120. For example, the RFID scanners 130, 230 may identify RFID cards on one side of the RFID scanners 130, 230 but not on another side of the RFID scanners 130, 230. In other examples, the RFID scanners 130, 230 may scan detect and/or scan for RFID tags in all directions (e.g., omnidirectionally scan) surrounding the RFID scanners 130, 230. Additionally or alternatively, the RFID scanners 130, 230 may alternate settings between directionally scanning for RFID tags and omnidirectionally scanning for RFID tags.

The example notifier 240 may be implemented by any consumer electronic device, such as a smartphone, a tablet, a computer, etc. The example RFID scanner 230 may communicate with the notifier 240 wirelessly using any suitable type of communication technique. Accordingly, the RFID card monitor 110 may be implemented by at least one of an application or software (e.g., machine-readable instructions) stored and executed on the notifier 240. The example notifier 240 of FIG. 2 notifies a user (e.g., via an alarm, a ringer, etc.) when an RFID card is removed from a proximity and/or added to a proximity surrounding the RFID card scanner 130. For example, the notifier 240 may begin to vibrate, flash a light (or LED), output an acoustic signal, etc.

In the illustrated examples of FIGS. 1 and/or 2, the RFID card monitor 110 monitors detected RFID cards 120 by tracking the presence of the cards within a proximity of the RFID scanners 130, 230. The example RFID card monitor 110 may store identifiers (e.g., an identifier corresponding to an RFID tag of the RFID cards 120) for each of the detected/monitored RFID cards 120. Accordingly, the RFID card monitor 110 of FIGS. 1 and/or 2 may include or be in communication with a database capable of storing information corresponding to the RFID cards 120. In examples disclosed herein, the RFID card monitor 110 determines when an RFID card has been added to the RFID cards 120 (and/or proximity of the RFID scanner) and/or to determine when one of the RFID cards 120 has been removed from the RFID cards 120 (and/or a proximity of the RFID scanners 130, 230).

Figure 3:
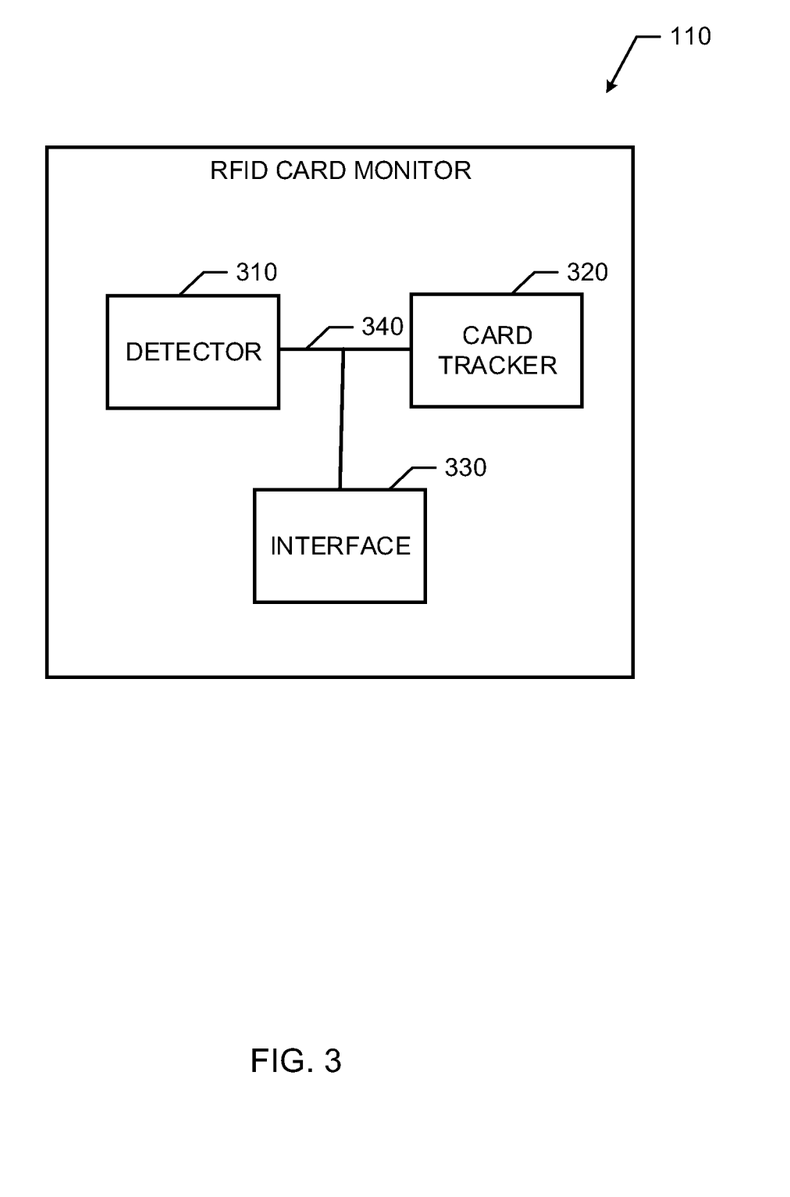
FIG. 3 is a block diagram of an example RFID card monitor that may be used to implement the RFID card monitor of FIGS. 1 and/or 2.

FIG. 3 is a block diagram of an example RFID card monitor 110 that may be used to implement the RFID card monitor of FIGS. 1 and/or 2. The example RFID card monitor 110 of FIG. 3 includes an example detector 310, an example card tracker 320, and an example interface 330. An example communication bus 340 facilitates communication between the detector 310, the card tracker 320, and/or the interface 330.

The example detector 310 of FIG. 3 detects when a new RFID card is within proximity of an RFID scanner (e.g., the RFID scanner 130 of FIG. 1 or the RFID scanner 230 of FIG. 2). The example detector 310 may receive RFID tag information from the RFID scanner 130 or 230 and determine whether an RFID tag (e.g., an RFID tag corresponding to one of the RFID cards 120) is registered with the RFID card monitor 110. In some examples, the detector 310 may control and/or schedule scans for RFID tags to detect the RFID cards 120. Accordingly, the detector 310 may control and/or manage scanning by the RFID scanner 130 and/or 230 of FIGS. 1 and/or 2.

The example card tracker 320 of FIG. 3 tracks the RFID cards 120 in proximity to the RFID scanners 130, 230 by monitoring a length of time and/or a number of times that an RFID tag corresponding to the RFID cards is detected/scanned by the RFID scanners 130, 230. In some examples, the card tracker 320 includes a database and/or a timer/timestamper. Accordingly, the database may be used to store detected and/or registered RFID tags corresponding to the RFID cards 120 in proximity to the RFID scanners 130, 230 and/or times corresponding to when the RFID tags were detected and/or scanned. The example card tracker 320 may use the time and/or timestamps to determine how long an RFID tag has been in proximity with the RFID scanners 130, 230. For example, based on a number and/or percentage of scans that an RFID tag is detected/scanned within a particular period of time, a determination may be made of whether one of RFID cards 120 is within proximity of the RFID scanners 130, 230.

Figure 4:
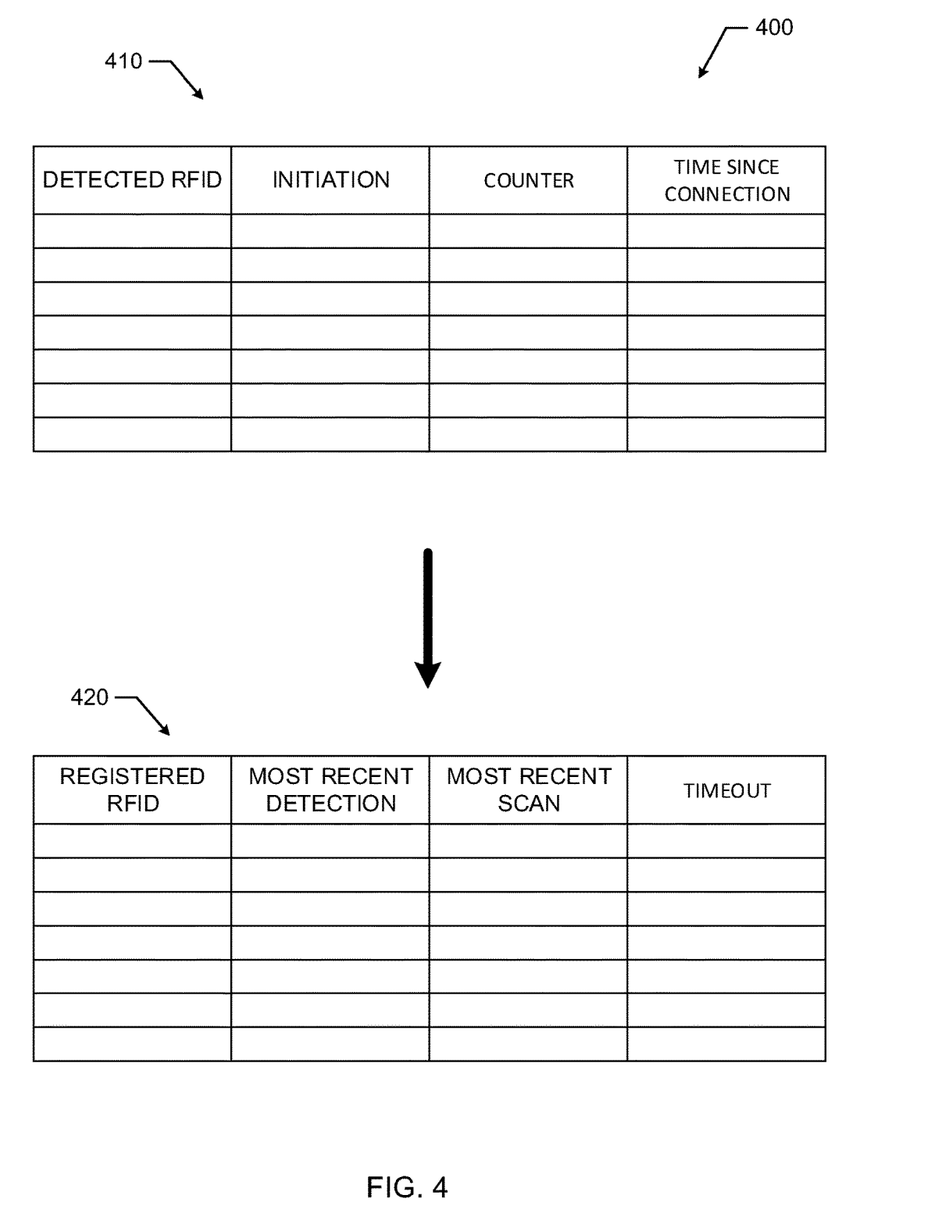
FIG. 4 illustrates an example database that may be implemented by the RFID card monitor of FIGS. 1, 2, and/or 3.

FIG. 4 illustrates an example database 400 that may be used to determine whether an RFID tag corresponds to a newly added RFID card and/or whether the RFID tag is to be registered to be monitored by the RFID card monitor 110. The example database 400 includes a detection database 410 and a registration database 420. In the illustrated example of FIG. 4, detected RFID tags may be tracked in a detection database 410. The example detection database 410 includes columns for tracking an RFID (e.g., the identifier of the tag such as at least one of a number, a name, a serial number, etc.), for a timestamp of an initial detection (initiation), a counter to count a number of scans since initial detection, and a time since connection. Accordingly, the card tracker 320 may use such information to determine whether the newly detected RFID is to be added as a registered RFID to the registered RFID database 420. For example, if a newly detected RFID is detected multiple times (as indicated by the counter) or is associated with a percentage of scans (i.e., counter divided by total scans) over a period of time (e.g., 15 minutes, an hour, a day, etc.), the card tracker 320 may determine that the RFID card is to be registered (i.e., monitored as a card in the RFID cards 120). In such an example, it may be presumed that because the card was detected for the designated period of time, it is now a card that is to be monitored. More specifically, for example, if a user adds a new card to his or her wallet, that new card will be registered as a card to be monitored after being detected for the designated period of time and/or being detected for a designated number or percentage scans during the period of time.

The example registration database 420 of FIG. 4 includes columns for tracking a registered RFID (e.g., an identifier of a tag including at least one of a number, a name, a serial number, etc.), for a timestamp of a most recent detection or scan, and a timeout indicating a time since last contact with an RFID card. In the registration database 420, a timeout does not exist if a time of a most recent detection of the RFID and a time of a most recent scan match or substantially match because this indicates the RFID card was detected during the most recent scan. When a time of a most recent detection and a time of the most recent scan do not match, a timeout has occurred indicating that the corresponding RFID card was not detected and is therefore, likely outside a proximity of the RFID scanner 130 or 230. Accordingly, the card tracker 320 may track a time period corresponding to a length of time the RFID card is considered to be outside of the proximity of the RFID scanner 130 or 230. The card tracker 320 may use the registration database to determine a most recent contact or when contact was not detected and after the timeout reaches a threshold period of time, the card tracker 320 may determine that the RFID card is missing (e.g., a card from a user's wallet was stolen, lost, dropped, etc.). The example card tracker 320 may then communicate with and/or notify the interface 330 that the card is missing.

Referring back to FIG. 3, the example interface 330 may facilitate user interaction with the RFID card monitor 110. The example interface may be implemented by any type of visual (e.g., a display, light emitting device, etc.), acoustic (e.g., a speaker, bell, siren, etc.), and/or vibration devices. Accordingly, a user may view, access, and/or adjust settings of the RFID card monitor 110 via the interface 330. For example, the user may adjust registration timing corresponding to a threshold period of time that a detected RFID card is to become a registered RFID card. Additionally or alternatively, a user may adjust removal timing corresponding to a threshold period of time that an RFID card is to be removed from an RFID card database (e.g., the registration database 420) via the interface 330. Furthermore, a user may adjust alert settings (sound, display, vibration, etc. and/or device communication, for example by identifying which device is to be used to notify (e.g., the RFID scanner 130 and/or the notifier 240)). In some examples, the interface 330 may provide different alert signals based on a length of time that the RFID card is determined to be outside of the proximity. For example, a first alarm may be sent as soon as it is determined that the RFID card is outside the proximity, a second alarm (e.g., having the same or a different type of alarm) may be sent after the RFID card is outside of the proximity for 5 minutes, etc.

While an example manner of implementing the RFID card monitor 110 of FIGS. 1 and/or 2 is illustrated in FIG. 3, at least one of the elements, processes and/or devices illustrated in FIG. 3 may be combined, divided, re-arranged, omitted, eliminated and/or implemented in any other way. Further, the example detector 310, the example card tracker 320, the example interface 330 and/or, more generally, the example RFID card monitor 110 of FIG. 3 may be implemented by hardware, software, firmware and/or any combination of hardware, software and/or firmware. Thus, for example, any of detector 310, card tracker 320, interface 330 and/or, more generally, the example RFID card monitor 110 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the detector 310, card tracker 320, and/or interface 330 is/are hereby expressly defined to include a tangible computer readable storage device or storage disk such as a memory, a digital versatile disk (DVD), a compact disk (CD), a Blu-ray disk, etc. storing the software and/or firmware. Further still, the example RFID card monitor 110 of FIG. 3 may include at least one element, process, and/or device in addition to, or instead of, those illustrated in FIG. 3, and/or may include more than one of any or all of the illustrated elements, processes and devices.

Figure 5:
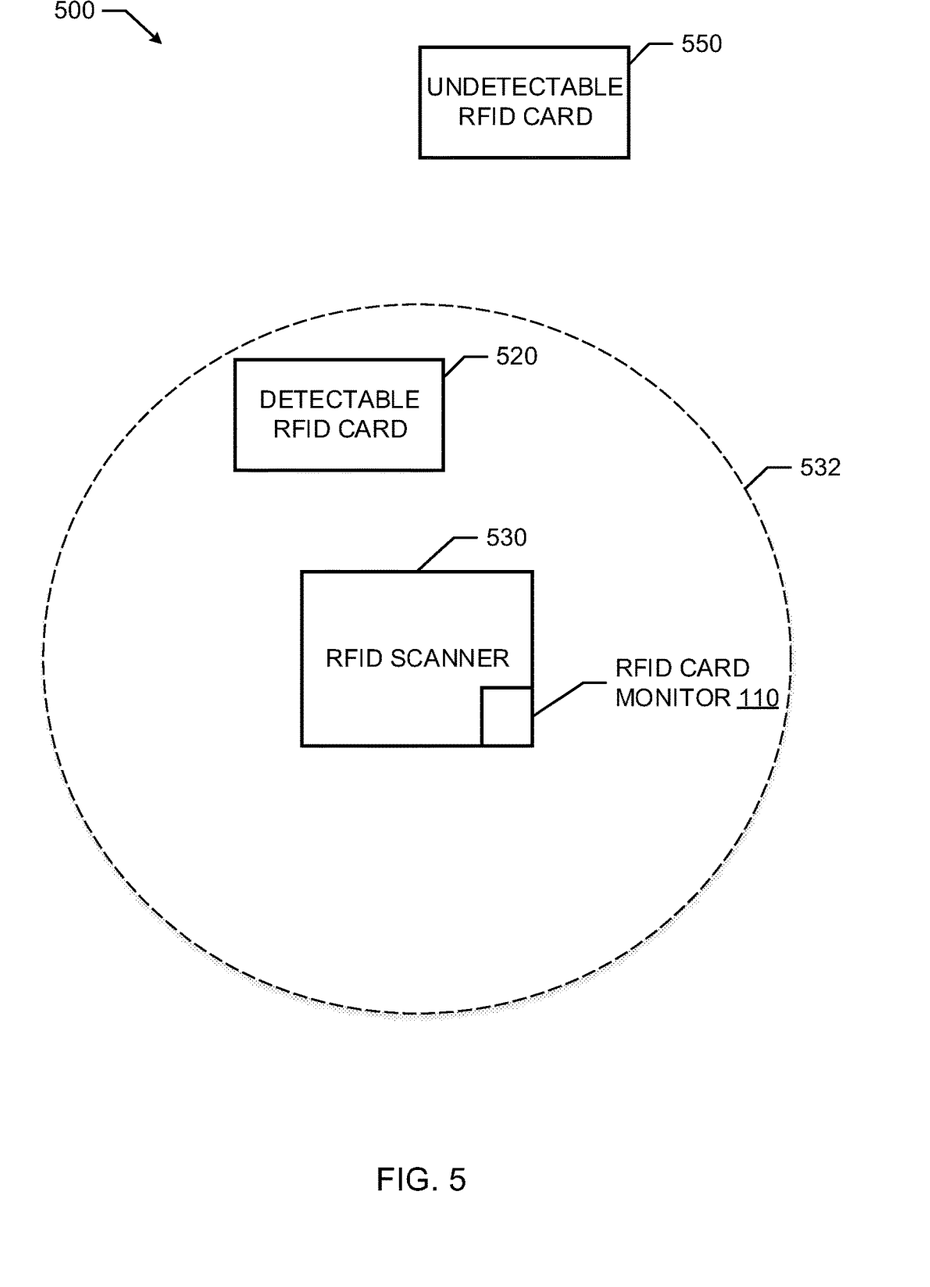
FIG. 5 is a schematic illustration of an example implementation of the RFID system of FIGS. 1 and/or 2, including an example use of the RFID card monitor of FIGS. 1, 2, and/or 3.

FIG. 5 is a schematic illustration of an example implementation 500 of the RFID system of FIGS. 1 and/or 2, including an example use of the RFID card monitor of FIGS. 1, 2, and/or 3. In the illustrated example of FIG. 5, an example RFID scanner 530 including an RFID card monitor 110 may scan for RFID cards within a designated proximity 532. As illustrated in FIG. 5, a detectable RFID card 520 is within the proximity 532, and can therefore be detected and/or monitor by the RFID scanner 530 and/or RFID card monitor 110. However, an undetectable RFID card 550 is located outside the proximity 532, and therefore cannot be detected and/or monitored by the example RFID scanner 530 and/or RFID card monitor 110. If the undetectable RFID card 550 were physically located within the proximity 532, the card may become detectable and after a particular period of time (e.g., the period of time set for registering an RFID card with the RFID card monitor) within the proximity 532, then the previously undetectable RFID card 550 may become registered with the RFID card monitor 110. The proximity 532 may be any distance (e.g., 1 foot, 1 yard, 1 meter, 5 meters, etc.) from the RFID scanner 530 that may be wirelessly scanned by the RFID scanner 530. In some examples the size of the proximity 532 may be adjusted (e.g., via the interface 330 of FIG. 3).

Figure 6:
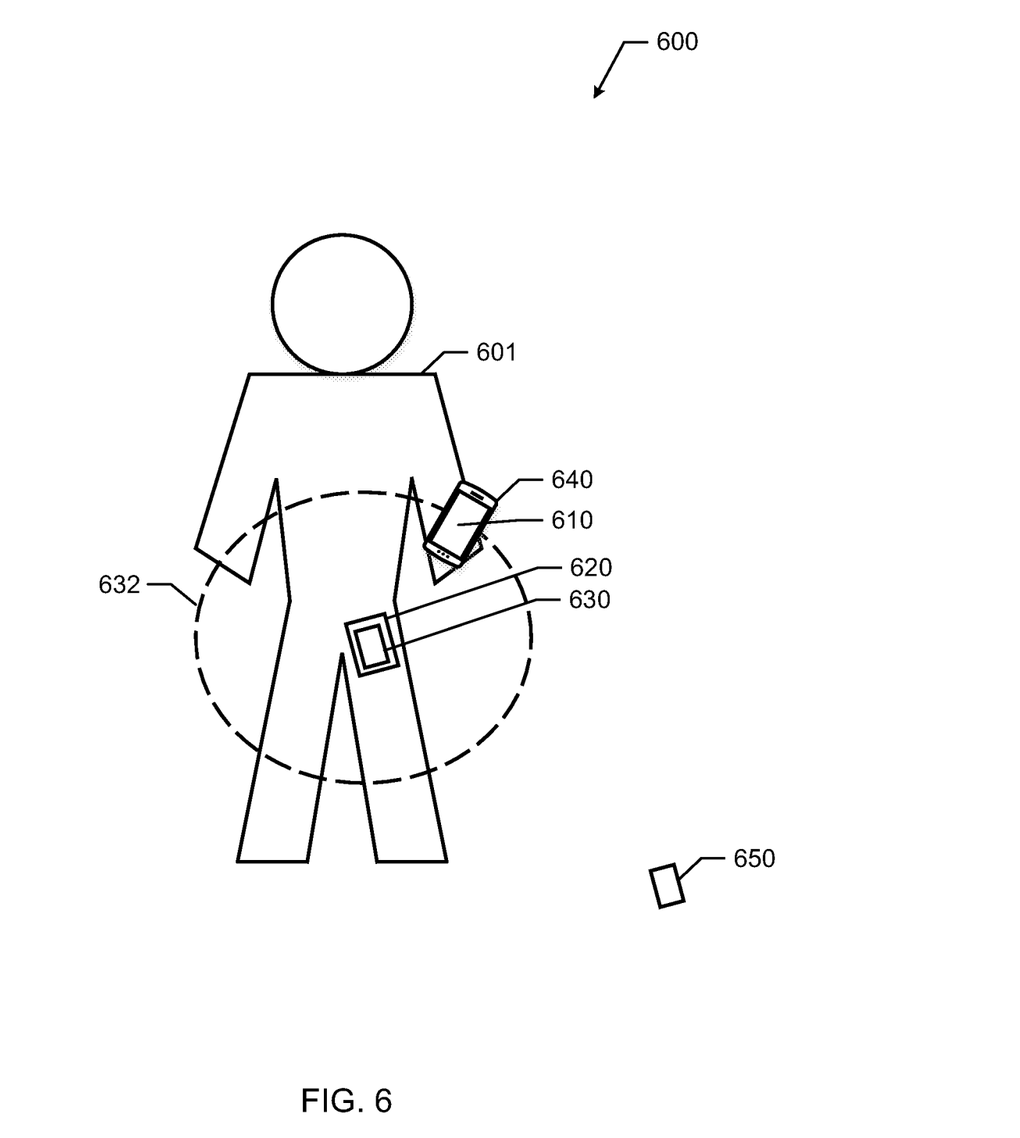
FIG. 6 illustrates an example environment of use for the RFID card monitor of FIGS. 1, 2, and/or 3.

FIG. 6 illustrates an example environment of use 600 for the RFID card monitor 110 of FIGS. 1, 2, and/or 3. In the illustrated example of FIG. 6, an example user 601 is carrying at least one RFID card 620, an RFID scanner 630 (which may be implemented by the RFID scanner 130 of FIG. 1 and/or RFID scanner 230 of FIG. 2), and a mobile device 640 (which may implement the notifier 240 of FIG. 2) including an RFID card monitor 610. In the illustrated example of FIG. 6, the RFID scanner 630 detects and/or monitors for RFID cards 620 and/or any other RFID card that comes within the proximity 632. An undetectable RFID card 650 is located outside of the proximity 632, and therefore cannot be detected by the RFID scanner 630 and/or monitored by the RFID card monitor 610 (or mobile device 640). For example, the undetectable RFID card 650 may have been dropped or lost by the user 601. In the illustrated example of FIG. 6, if the undetectable RFID card 650 was previously located within the proximity 632, the RFID card monitor 610 may alert the user 601 via the mobile device 640. For example, an alarm of the mobile device may signal and/or display to the user 601 that the card 650 is no longer within the proximity 632. Accordingly, the user 601 may determine that one of his or her RFID cards has gone missing from his or her person (as the RFID card scanner 630 is on his or her person).

Figure 7:
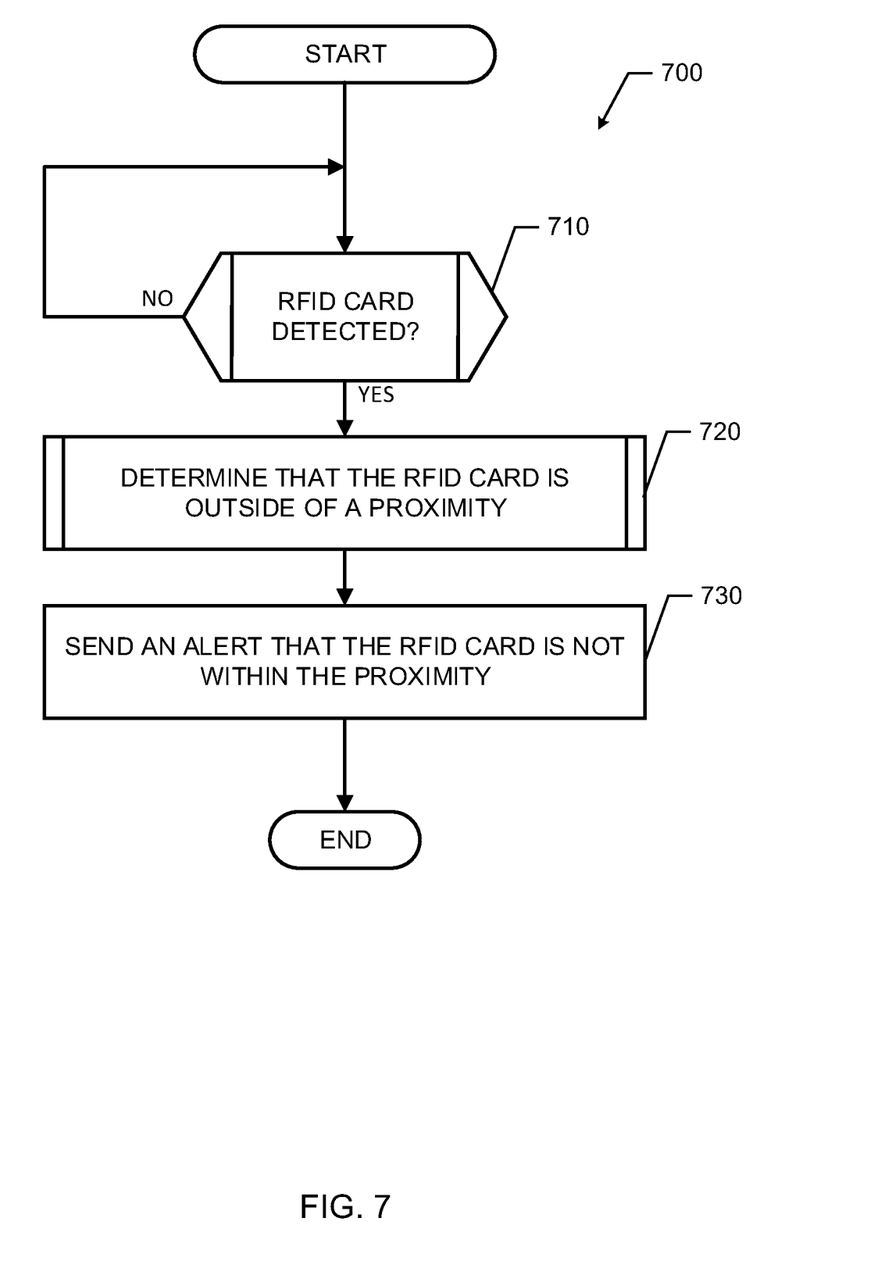
FIG. 7 is a flowchart representative of example machine readable instructions that may be executed to implement the RFID card monitor of FIGS. 1, 2, and/or 3.
Figure 8:
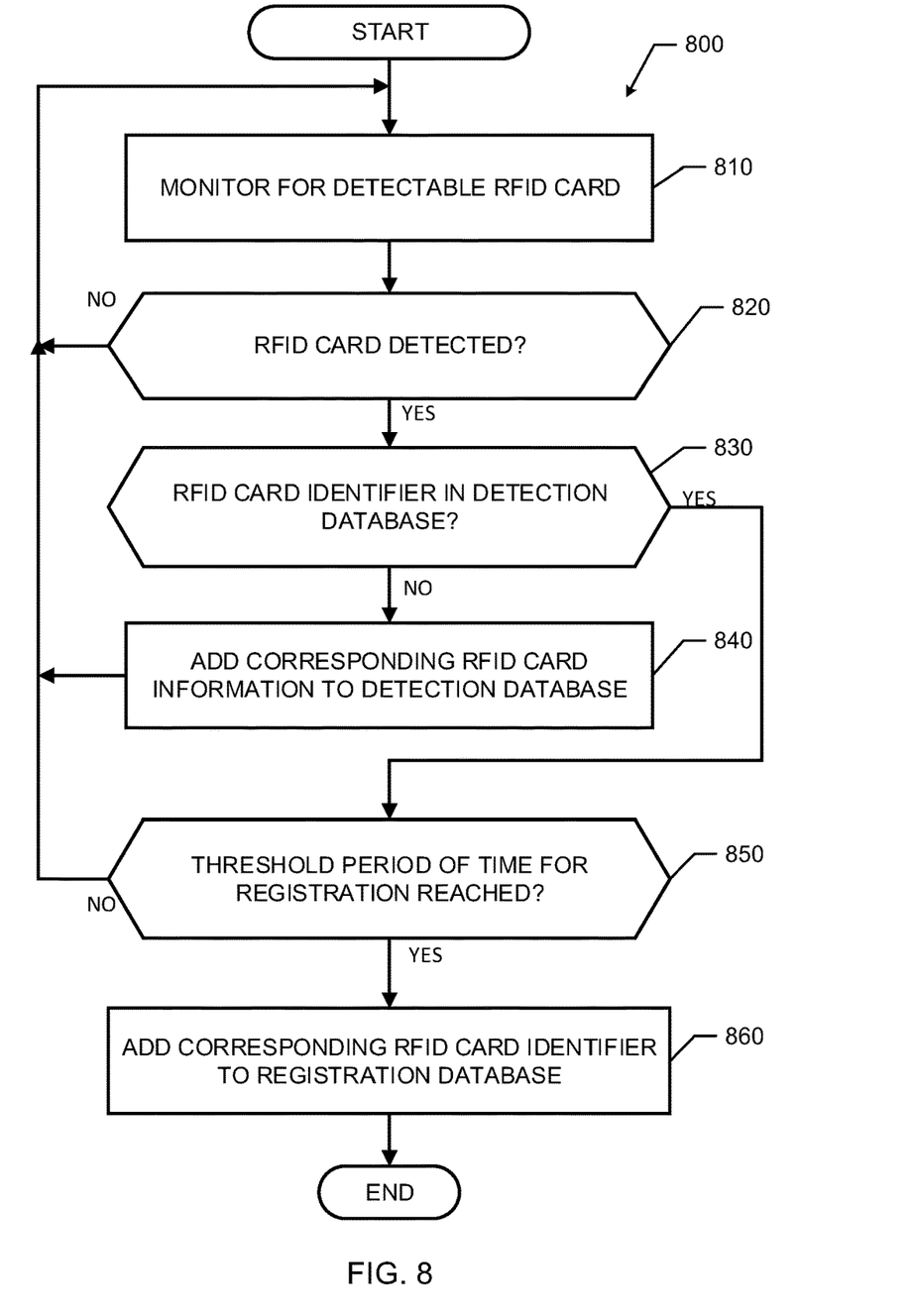
FIG. 8 is a flowchart representative of example machine readable instructions that may be executed to implement a portion of the machine readable instructions of FIG. 7 to implement the RFID card monitor of FIGS. 1, 2, and/or 3 to detect and/or register RFID cards.

Flowcharts representative of example machine readable instructions for implementing the RFID card monitor 110 of FIG. 3 are shown in FIGS. 7, 8, and/or 9. In this example, the machine readable instructions comprise a program/process for execution by a processor such as the processor 1012 shown in the example processor platform 1000 discussed below in connection with FIG. 10. The program/process may be embodied in software stored on a tangible computer readable storage medium such as a CD-ROM, a floppy disk, a hard drive, a digital versatile disk (DVD), a Blu-ray disk, or a memory associated with the processor 1012, but the entire program/process and/or parts thereof could alternatively be executed by a device other than the processor 1012 and/or embodied in firmware or dedicated hardware. Further, although the example program is described with reference to the flowchart illustrated in FIGS. 7, 8, and/or 9, many other methods of implementing the example RFID card monitor 110 may alternatively be used. For example, the order of execution of the blocks may be changed, and/or some of the blocks described may be changed, eliminated, or combined.

FIG. 7 is a flowchart representative of example machine readable instructions comprising a program/process 700 that may be executed to implement the RFID card monitor of FIGS. 1, 2, and/or 3. The example machine readable instructions 700 of FIG. 7 begin with an initiation of the RFID card monitor 110 (e.g., upon startup, upon instructions from a user, in response to the RFID scanner 130 and/or notifier 240 starting up and/or initiating the RFID card monitor 110, etc.). The example program/process 700 may be iteratively repeated and/or repeated for each RFID card detected by the RFID card scanner 130, 230 and/or each RFID card monitored by the RFID card monitor 110.

At block 710 of FIG. 7, the detector 310 determines whether an RFID card (e.g., one of the RFID cards 120 of FIG. 1) is detected. If an RFID card is not detected, the detector 310 continues to monitor detections made RFID scanner 130 or 230 (control returns to block 710). If the detector 310 does determine that an RFID card is detected (block 710), then the card tracker 320 tracks the RFID card and determines that the RFID card is not within a proximity. For example, after the card is detected, the RFID card tracker 320 monitors for future scans/detections of the RFID card, and if a period of time (e.g., a minute, 5 minutes, 15 minutes) passes where the RFID card is not detected, then, at block 720, the card tracker 320 determines that the RFID card is not within a proximity of the RFID scanner 130 or 230. At block 730, the interface 330 sends an alert to indicate that the RFID card is not within a proximity of the RFID scanner 130 or 230. After block 730, the instructions 700 end.

FIG. 8 is a flowchart representative of example machine readable instructions 800 that may be executed to implement block 710 of FIG. 7 to implement the RFID card monitor of FIGS. 1, 2, and/or 3 to detect and/or register RFID cards. The example program/process 800 of FIG. 8 may be executed to determine whether to register a detected RFID card with the RFID card monitor such that the RFID card monitor monitors the presence of the RFID card in accordance with the teachings of this disclosure. The program/process 800 of FIG. 8 begin with an initiation of the RFID card monitor 110. At block 810, the detector 310 monitors for RFID cards detected by the RFID scanner 130 or 230. At block 820, the detector 310 determines whether an RFID card was detected (e.g., from RFID tag information received from the RFID scanner 130 or 230). If no RFID card is detected, the detector 310 continues to monitor the RFID scanner 130 or 230 scans for detectable RFID cards (control returns to block 810). If the detector 310 determines that an RFID card was detected, control advances to block 830.

At block 830, the detector 310 determines whether the detected RFID card is in a detection database (e.g., the detection database 410 of FIG. 4). If the RFID card is not in the detection database (block 830), then the detector 310 adds corresponding RFID card information (e.g., an identifier, a timestamp, time of last scan, etc.) to the detection database at block 840. After block 840, control returns to block 810 to continue monitoring for detection/scans of the RFID card.

If, at block 830, the detector determines that the RFID card identifier of the detected RFID card is in the detection database (block 830), control advances to block 850. At block 850, the detector 310 determines whether a threshold period of time (e.g., 1 minute, 10 minutes, 1 hour, etc.) for registration has been reached. If, at block 850, the threshold period of time has not been reached, control returns to block 710. If, at block 850, the threshold period of time has been reached, the detector 310 and/or the card tracker 320 at block 860 adds the corresponding RFID information (e.g., identifier, timestamp, time of last scan, etc.) to a registration database (e.g., the registration database 420). After block 860, the program/process 800 of FIG. 8 ends and control may advance to block 720 of FIG. 7 and/or onto instructions 720 of FIG. 8.

Figure 9:
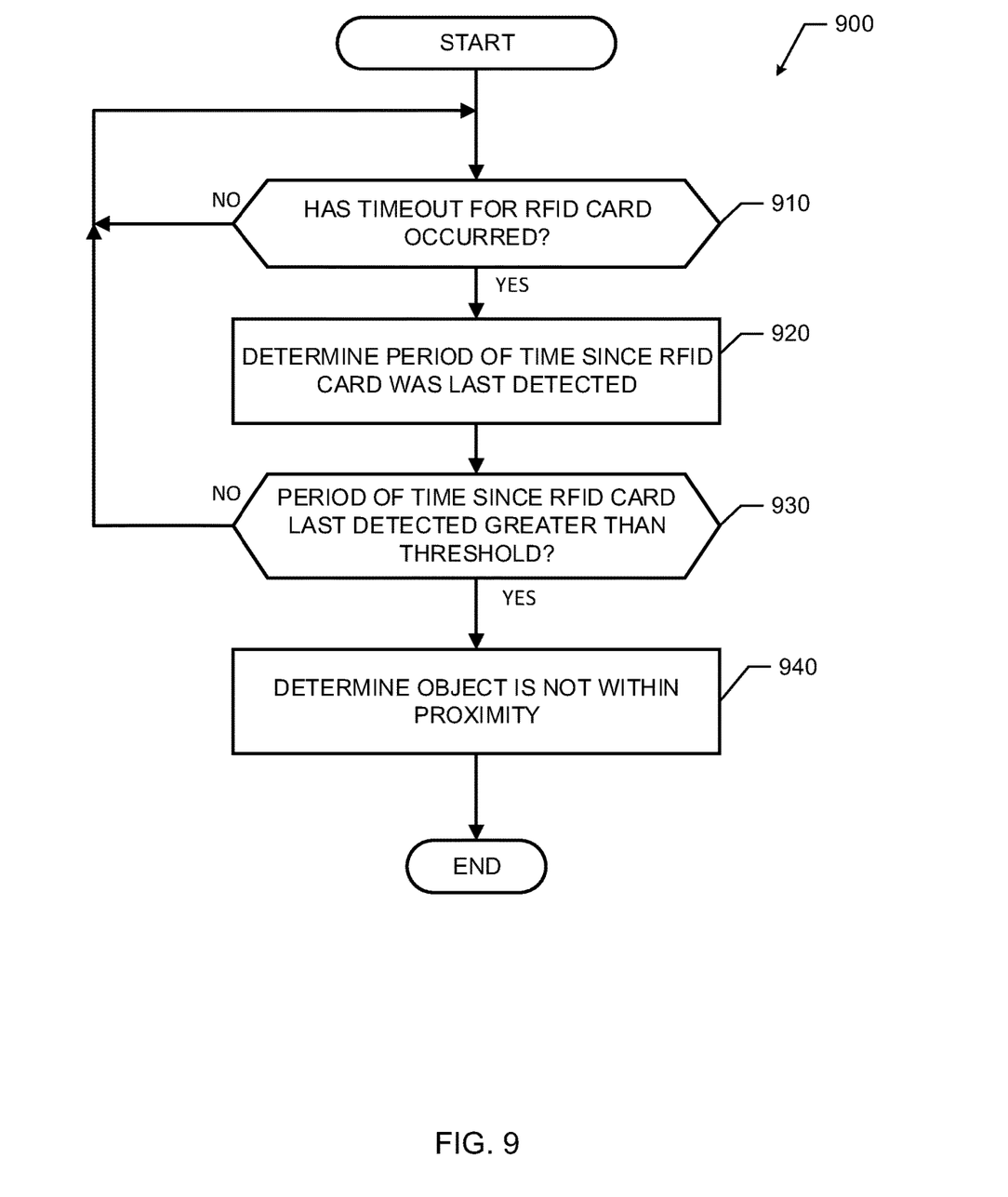
FIG. 9 is a flowchart representative of example machine readable instructions that may be executed to implement another portion of the machine readable instructions of FIG. 7 to implement the RFID card monitor of FIGS. 1, 2, and/or 3.

FIG. 9 is a flowchart representative of example machine readable instructions comprising a program/process 900 that may be executed to implement block 720 of the machine readable instructions of FIG. 7 to implement the RFID card monitor of FIGS. 1, 2, and/or 3. The example program/process 900 of FIG. 9 may be executed to determine whether an RFID card is not within a designated proximity of an RFID card scanner 130, 230 and/or RFID card monitor 110. The example machine readable instructions 720 of FIG. 9 begin with an initiation of the RFID card monitor 110. At block 910, the card tracker 320 determines whether a timeout for a monitored RFID card has occurred. If not timeout has occurred, the card tracker 320 continues to monitor for detections and/or scans of the RFID card. If it is determined that a timeout has occurred at block 910 (e.g., a time corresponding to a last detection of an RFID does not match or substantially match a time of a last scan for RFID cards by the RFID card scanner 130, 230), the card tracker 320 determines a period of time since the RFID card was last detected at block 920. At block 930, the example card tracker 320 determines whether the period of time since the RFID card was last detected is greater than a threshold. If the period of time is not greater than a threshold, control returns to block 910 to continue to monitor for a detection of the RFID card. For example, the threshold period of time may allow for an RFID card to be intentionally removed from the proximity for a period of time less than the threshold period of time (e.g., when a user temporarily gives his or her credit card to a retailer, restaurant waiter, service provider, etc.). If at block 930, the period of time does exceed the threshold period of time (e.g., 5 minutes, 10 minutes, etc.), the example card tracker 320 may determine that the card is not within the proximity of the RFID scanner 130, 230 and/or RFID card monitor 110. After block 940, the program process 900 ends and control may advance to block 730 of FIG. 7 to alert a user.

As mentioned above, the example processes of FIGS. 7, 8, and/or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7, 8, and/or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element.

Figure 10:
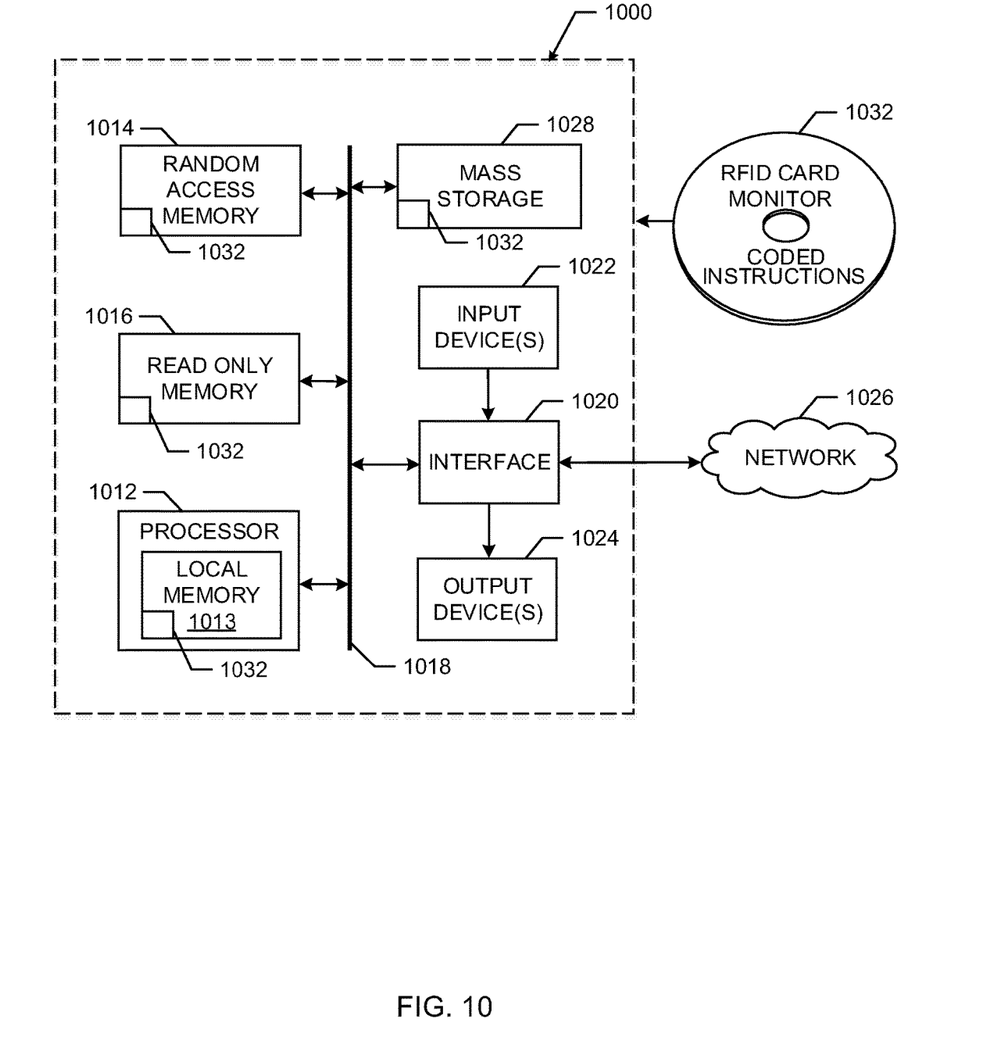
FIG. 10 is a block diagram of an example processor platform capable of executing the instructions of FIGS. 7, 8, and/or 9 to implement the RFID card monitor of FIG. 3.

FIG. 10 is a block diagram of an example processor platform 1000 capable of executing the instructions of FIGS. 7, 8, and/or 9 to implement the RFID card monitor 110 of FIG. 3. The example processor platform 1000 may be any type of apparatus or may be included in any type of apparatus, such as a server, a personal computer, a mobile device (e.g., a cell phone, a smart phone, a tablet, etc.), a personal digital assistant (PDA), an Internet appliance, and/or any other type of computing device.

The processor platform 1000 of the illustrated example of FIG. 10 includes a processor 1012. The processor 1012 of the illustrated example is hardware. For example, the processor 1012 can be implemented by at least one integrated circuit, logic circuit, microprocessor, or controller from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, at least one input device 1022 is connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 1024 is also connected to the interface circuit 1020 of the illustrated example. The output device(s) 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes at least one mass storage device 1028 for storing software and/or data. Examples of such mass storage device(s) 1028 include floppy disk drives, hard drive disks, compact disk drives, Blu-ray disk drives, RAID systems, and digital versatile disk (DVD) drives.

The coded instructions 1032 of FIGS. 7, 8, and/or 9 may be stored in the mass storage device 1028, in the local memory 1013 in the volatile memory 1014, in the non-volatile memory 1016, and/or on a removable tangible computer readable storage medium such as a CD or DVD.

From the foregoing, it will be appreciated that the above disclosed methods, apparatus and articles of manufacture provide a radio frequency identification (RFID) card monitor that determines when an RFID card is no longer within a designated proximity. The example RFID card monitor may monitor a length of time that a least one RFID card is outside of a proximity and alert a user based on the length of time. Accordingly, examples disclosed herein enable a user to add cards (e.g., credit cards, debit cards, identification cards, security cards/badges, etc.) to a proximity (e.g., an area within a wallet, a pocket, a purse, etc.) to be automatically monitored and/or remove cards from the proximity for a period of time without an alert.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   detecting, via a processor, a radio frequency identification card within a proximity, the radio frequency identification card comprising a radio frequency identification tag, wherein the detecting the radio frequency identification card is based on scanning the radio frequency identification card using at least one of directional scanning or omnidirectional scanning, wherein the proximity is adjustable;
   registering the radio frequency identification card based on a determination that a percentage of scans, associated with the radio frequency identification card, over a designated period of time exceeds a threshold percentage, wherein the percentage of scans is determined by a number of detections of the radio frequency identification card divided by a number of scans;
   determining that the registered radio frequency identification card is outside the proximity; and
   sending an alert indicating that the registered radio frequency identification card is not within the proximity.

2. The method of claim 1, further comprising determining that the registered radio frequency identification card is outside the proximity for a period of time, wherein the alert is sent after the period of time.

3. The method of claim 1, wherein the radio frequency identification card is a first radio frequency identification card, and wherein the method further comprises:
   detecting that a second radio frequency identification card is within the proximity; and
   monitoring the second radio frequency identification card to detect when the second radio frequency identification card is not within the proximity.

4. The method of claim 1, wherein the alert is sent to a mobile device of a user, wherein the mobile device is to notify the user that the registered radio frequency identification card is missing.

5. The method of claim 1, wherein the radio frequency identification card is one of a credit card, a debit card, an identification card, or a security identification badge.

6. The method of claim 5, wherein the radio frequency identification tag facilitates one of a credit transaction, a debit transaction, or access to a secure location.

7. An apparatus comprising:
   a detector to detect a radio frequency identification card within a proximity of a device, the radio frequency identification card comprising a radio frequency identification tag, wherein the detecting of the radio frequency identification card is based on scanning of the radio frequency identification card by the device, the scanning using at least one of directional scanning or omnidirectional scanning, wherein the proximity is adjustable;
   a card tracker to track the radio frequency identification card within the proximity of the device and register the radio frequency identification card based on a determination that a percentage of scans, associated with the radio frequency identification card, over a designated period of time exceeds a threshold percentage, wherein the percentage of scans is determined by a number of detections of the radio frequency identification card divided by a number of scans; and
   an interface to provide alerts when the registered radio frequency identification card is not within the proximity.

8. The apparatus of claim 7, wherein the detector detects the radio frequency identification card within the proximity of the device in response to the device no longer detecting the radio frequency identification card via near field communication.

9. The apparatus of claim 7, wherein the card tracker tracks the radio frequency identification card by timing a length of time that the radio frequency identification cards are one of within the proximity of the device or not within the proximity of the device.

10. The apparatus of claim 7, wherein the card tracker tracks the radio frequency identification card by repeatedly scanning for the radio frequency identification tag using near field communication.

11. The apparatus of claim 7, wherein the detector, the card tracker, and the interface are located on a second device, the second device being different from the device.

12. A non-transitory computer readable storage medium comprising instructions that, when executed, cause a machine to:
   detect that a radio frequency identification card is within a proximity of a device during a first near field communication scan for the radio frequency identification card, the radio frequency identification card comprising a radio frequency identification tag, wherein the detection of the radio frequency identification card is based on scanning the radio frequency identification card using at least one of directional scanning or omnidirectional scanning, wherein the proximity is adjustable;
   register the radio frequency identification card based on a determination that a percentage of scans, associated with the radio frequency identification card, over a designated period of time exceeds a threshold percentage, wherein the percentage of scans is determined by a number of detections of the radio frequency identification card divided by a number of scans;
   identify that the registered radio frequency identification card is outside of the proximity of the device during a second near field communication scan for the registered radio frequency identification card; and
   send an alert to indicate that the registered radio frequency identification card is outside of the proximity based on a length of time.

13. The non-transitory computer readable medium of claim 12, wherein the instructions, when executed, further cause the machine to:
   add an identifier corresponding to the radio frequency identification tag to a database after a third near field communication scan, the third near field communication scan occurring after the first near field communication scan and a threshold period of time and before the second near field communication scan.

14. The non-transitory computer readable medium of claim 12, wherein the instructions, when executed, further cause the machine to:
   adjust settings corresponding to the length of time in response to a user input.

15. The non-transitory computer readable medium of claim 12, wherein the instructions, when executed, further cause the machine to:
   adjust settings to change a size of the proximity in response to a user input.

* * * * *